(12) United States Patent
Jew et al.

(10) Patent No.: US 11,226,436 B2
(45) Date of Patent: Jan. 18, 2022

(54) METHOD FOR CO-LOCATING DISSIMILAR OPTICAL SYSTEMS IN A SINGLE APERTURE

(71) Applicant: BAE SYSTEMS Information and Electronic Systems Integration Inc., Nashua, NH (US)

(72) Inventors: Jeffrey L. Jew, Brookline, NH (US); Ian B. Murray, Amherst, NH (US); Michael J. Shaw, Epsom, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 117 days.

(21) Appl. No.: 16/718,608

(22) Filed: Dec. 18, 2019

(65) Prior Publication Data

US 2021/0191007 A1 Jun. 24, 2021

(51) Int. Cl.
*G02B 5/04* (2006.01)
*G02B 3/00* (2006.01)

(52) U.S. Cl.
CPC .......... *G02B 5/045* (2013.01); *G02B 3/0068* (2013.01)

(58) Field of Classification Search
CPC ................................ G02B 5/045; G02B 3/006
See application file for complete search history.

(56) References Cited

U.S. PATENT DOCUMENTS

| | | | |
|---|---|---|---|
| 4,950,056 A | 8/1990 | Smith | |
| 6,870,690 B1 * | 3/2005 | Lawson | .................. G02B 3/10 359/721 |
| 8,294,988 B2 | 10/2012 | Cook | |
| 9,025,256 B2 | 5/2015 | Cook | |
| 9,140,901 B2 | 9/2015 | Staver | |
| 10,379,195 B2 | 8/2019 | Jungwirth et al. | |
| 2009/0079824 A1 | 3/2009 | Winsor | |
| 2015/0145950 A1 | 5/2015 | Murphy et al. | |
| 2016/0334618 A1 | 11/2016 | Hargis et al. | |
| 2017/0195569 A1 | 7/2017 | Lapstun et al. | |
| 2018/0045960 A1 | 2/2018 | Palacios et al. | |
| 2019/0243128 A1 * | 8/2019 | Johnson | .................. G02B 5/04 |

OTHER PUBLICATIONS

International Search Report, PCT/US20/65259, dated Mar. 19, 2021, 9 pages.
International Search Report, PCT/US20/65118, dated Mar. 19, 2021, 10 pages.

* cited by examiner

*Primary Examiner* — Robert E. Tallman
(74) *Attorney, Agent, or Firm* — KPIP Law, PLLC; Scott J. Asmus

(57) ABSTRACT

The system and method for combining two optical assemblies into the same volume, particularly when the field of view of the two assemblies are different, so that the overall volume and size, weight and power (SWaP) for the system is reduced. This also allows both subsystems (e.g., narrow field of view (NFOV) and wide field of view (WFOV) to use a single aperture and the same external protective window, reducing overall cost for a system of co-located dissimilar optical systems in a single aperture.

16 Claims, 7 Drawing Sheets

METHOD FOR CO-LOCATING DISSIMILAR OPTICAL SYSTEMS IN A SINGLE APERTURE

STATEMENT OF GOVERNMENT INTEREST

This disclosure was made with United States Government support under Contract No. 18-C-8749 awarded by a Classified Agency. The United States Government has certain rights in this disclosure.

FIELD OF THE DISCLOSURE

The present disclosure relates to optical systems and more particularly to co-locating dissimilar optical systems in a single aperture.

BACKGROUND OF THE DISCLOSURE

It is understood that it is difficult to combine multiple optical systems into a single aperture. Additionally, low size, weight, and power (SWAP) approaches limit the dissimilarity between systems. For very dissimilar optics, i.e. wide field of view (WFOV) and narrow field of view (NFOV), typical approaches require separate apertures; combining different wavelengths may be achieved using beam splitters. Wherefore it is an object of the present disclosure to overcome the above-mentioned shortcomings and drawbacks associated with conventional single aperture systems comprising multiple dissimilar optical systems.

Existing applications that require both WFOV and NFOV require two separate subsystems, each with its own external window for protection, optical assembly for collecting and focusing the energy from the scene, and detector for converting the energy from photons to electrons. The separate optical assemblies need a finite amount of space between them for mechanical structure, which results in a large volume.

Our approach is to combine the two optical assemblies into the same volume, even if the field of view of the two assemblies are radically different, so that the overall volume and SWAP is reduced. This also allows both subsystems to use the same external protective window, reducing overall cost.

SUMMARY OF THE DISCLOSURE

One aspect of the present disclosure is an optical system, comprising: a center section; and an outer region; wherein the center section has a first field of view with spectral coverage of one waveband and the outer region has a second field of view with spectral coverage of another waveband within a single aperture. A single aperture allows for the usage of a single external protective window. The external protective window in one example is a window in the housing of the system that allows the imaging system to capture external images.

One embodiment of the optical system is wherein the outer region is a Risley prism assembly, constructed of two or more prism elements such that the outer region is transmissive for the outer region waveband(s) and the center section is a lens assembly that is transmissive for the inner region waveband(s). In some cases, the outer region is a narrow field of view (NFOV) subsystem and the center section is a wide field of view (WFOV) subsystem.

Another embodiment of the optical system is wherein the distinction between a subsystem being NFOV or WFOV is a relative difference in angular object space coverage. In certain embodiments, effective focal lengths for the WFOV and the NFOV differ by at least 2×.

Yet another embodiment of the optical system is wherein the outer region may be steered by rotating the Risley prism assembly, and the center region remains unsteered during rotation of the Risley prism assembly.

In still yet another embodiment of the optical system, the lens assembly is formed integrally with the Risley prism assembly. In some cases, one or more lenses of the lens assembly is glued to one prism in the Risley prism assembly.

In another embodiment of the optical system, subsystems of the outer region and the center section contain optical elements and detectors that cover different spectral wavebands. In some cases, the wavebands comprise one or more of the following: ultraviolet (UV) region between 250 nm and 400 nm, visible (VIS) region between 400 nm and 700 nm, near-infrared (NIR) region between 700 nm and 1200 nm, shortwave infrared (SWIR) region between 1200 nm and 2500 nm, midwave infrared (MWIR) region between 2500 nm and 5500 nm, and longwave infrared (LWIR) region between 5500 nm and 14000 nm. Thus the imaging system in one example uses one or more of the UV, VIS, NIR, SWIR, MWIR and LWIR detectors for the NFOV and WFOV processing detailed herein.

In certain embodiments, the center section comprises glass, semiconductor material, or other substrate that is transmissive at the relevant waveband. In some cases, the outer region comprises glass, semiconductor material, or other substrate that is transmissive at the relevant waveband.

Another aspect of the present disclosure is an optical system, comprising: a center section; and an outer region; wherein the center section has a first field of view with spectral coverage of one waveband and the outer region has a second field of view with spectral coverage of another waveband within a single aperture and the outer region is a Risley prism assembly, constructed of two or more prism elements such that the outer region is transmissive for the outer region waveband(s) and the center section is a lens assembly that is transmissive for the inner region waveband(s).

One embodiment of the optical system is wherein the outer region is a narrow field of view (NFOV) subsystem and the center section is a wide field of view (WFOV) subsystem. In some cases, the distinction between a subsystem being NFOV or WFOV is a relative difference in angular object space coverage. In certain embodiments, effective focal lengths for the WFOV and the NFOV differ by at least 2×.

Another embodiment of the optical system is wherein the outer region may be steered by rotating the Risley prism assembly, and the center region remains unsteered during rotation of the Risley prism assembly.

Yet another aspect of the present disclosure is an optical system, comprising: a center section; and an outer region; wherein the center section has a first field of view with spectral coverage of one waveband and the outer region has a second field of view with spectral coverage of another waveband within a single aperture; the wavebands comprise one or more of the following: ultraviolet (UV) region between 250 nm and 400 nm, visible (VIS) region between 400 nm and 700 nm, near-infrared (NIR) region between 700 nm and 1200 nm, shortwave infrared (SWIR) region between 1200 nm and 2500 nm, midwave infrared (MWIR) region between 2500 nm and 5500 nm, and longwave infrared (LWIR) region between 5500 nm and 14000 nm; and the outer region is a Risley prism assembly, constructed of two or more prism elements such that the outer region is transmissive for the outer region waveband(s) and the center section is a lens assembly that is transmissive for the inner region waveband(s).

One embodiment of the optical system is wherein the lens assembly is formed integrally with the Risley prism assembly.

In another embodiment, one or more lenses of the lens assembly is glued to one prism in the Risley prism assembly.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

The use of freeform optics and/or a spatial beam combiner allows the combination of multiple optical systems within a single aperture. When the beam combiner contains at least one axis of symmetry and the steering optics are capable of rotating, it is possible to combine a wide field of view (WFOV) staring system with a wide Field of Regard (FOR) steered narrow field of view (NFOV) system in a single aperture. The separation between WFOV and NFOV depends on the application; visible wavelength camera lenses are considered WFOV when they allow a given sensor to see more than 60° of full field angular object space whereas space telescopes are considered WFOV for full angles above 5°. The distinction between NFOV and WFOV is therefore relative, and for similar focal plane dimensions (length and width), the effective focal lengths between the WFOV and NFOV differ at least 2×.

Existing approaches for simultaneous staring WFOV and steered NFOV performance require separate apertures and external windows or have expensive, large-SWAP beam splitters to account for different wavelengths. In one example of the present system, freeform (slow-tool-servo) diamond turning (DT) equipment may be used, for example, if the Risley wedges and the lenses are to be made at the same time on the same machine.

One embodiment of the present disclosure is a more compact way of providing multiple optical systems in a single aperture. In one embodiment, the center section of a Risley prism assembly, constructed of two or more prism elements, is replaced by lenses. In these cases, the center section could be used for one FOV and the outer region could be used for another for another FOV.

In certain embodiments of the system of the present disclosure, freeform diamond-turning is used to make the components. In some cases, using lenses within the Risley wedges significantly stresses the opto-mechanical tolerances. It may be necessary to align the Risley wedges in six degrees of freedom (DOF) and hold them there during their entire range of roll, otherwise the lenses may change alignment and the inner region will move around and likely blur for some the Risley prism orientations. However, in certain embodiments, the central region is cored out, and instead of making the lenses part of the wedge substrates, a separate lens assembly is formed and is inserted into the cored regions.

Figure 1:
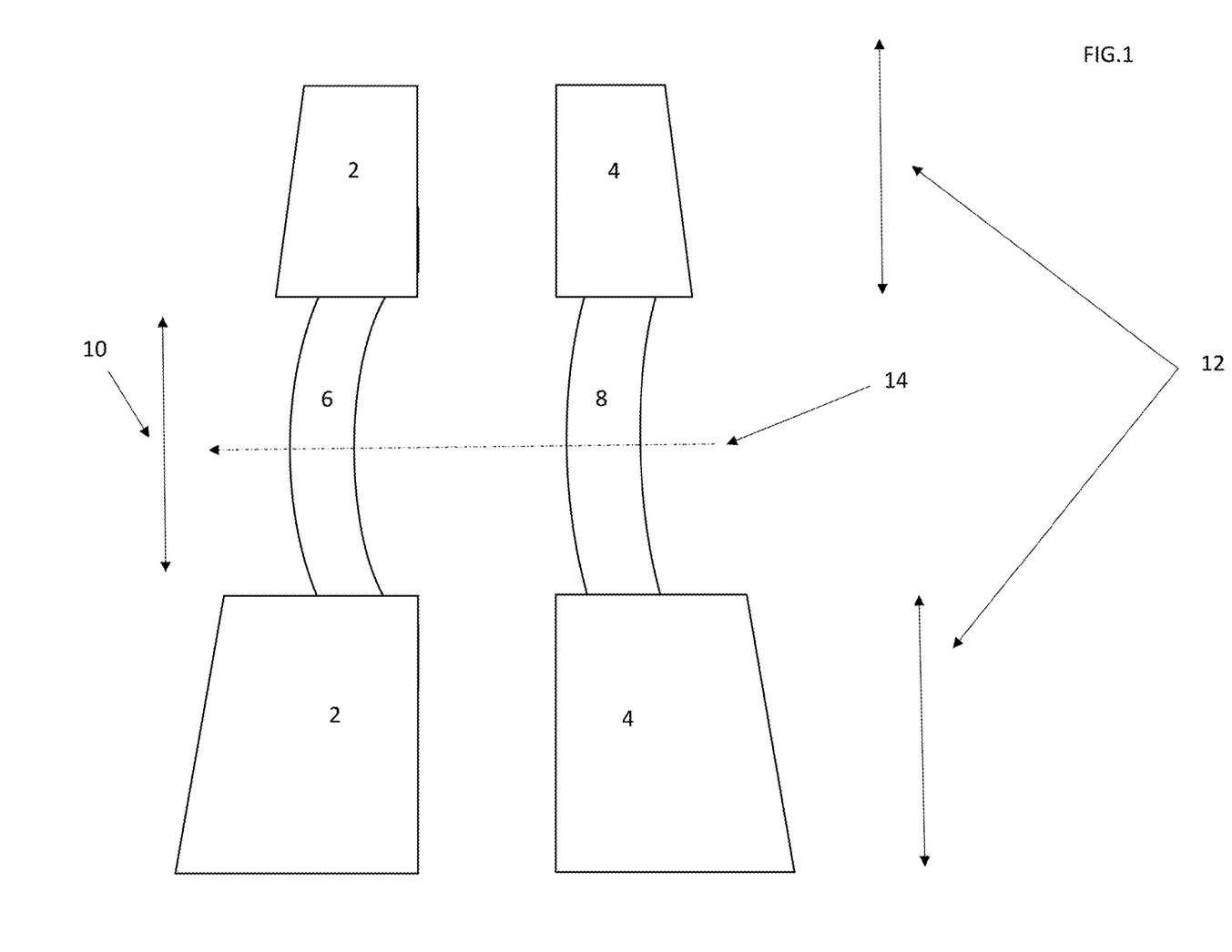
FIG. 1 shows a diagram of one embodiment of dissimilar optical systems co-located in a single aperture according to the principles of the present disclosure.

Referring to FIG. 1, a diagram of one embodiment of dissimilar optical systems co-located in a single aperture according to the principles of the present disclosure is shown. More specifically, a section view of a first Risley prism 2 and a second Risley prism 4 are shown. Risley prisms are an assembly consisting of two or more thin wedge prisms in series or coupled together. The prisms on each side are usually identical, but can also be different and have different properties. When the prisms are counter-rotated, the magnitude of beam deviation is changed. Similarly, when they are rotated together, the direction of deviation is rotated. Beam steering using Risley prisms is possible by rotating the wedge prisms independently of each other. A rotational axis 14 is shown.

Still referring to FIG. 1, an outer prismatic ring 12 is shown along with a rotationally symmetric inner region 10 according to the principles of the present disclosure. Here, a first lens 6 is co-located within a first half of the Risley prism assembly 2 and a second lens 8 is co-located within a second half Risley prism assembly 4. In one example, co-located is the Risley prism having an integral monolithic center lens.

In certain embodiments, lenses may be made of glass, semiconductor materials, or other types of substrates that are transmissive at the relevant waveband. For the embodiments that use diamond turning, the substrates are made with materials that are compatible with this process. In certain embodiments, prisms may be made of glass (e.g., BK7, fused silica, chalcogenide, etc.), semiconductor materials (e.g., Germanium, Silicon, Zinc Sulfide, etc.), or other types of substrates that are transmissive at the relevant waveband as well (e.g., fluorides, salts, polymers, etc.).

Figure 2:
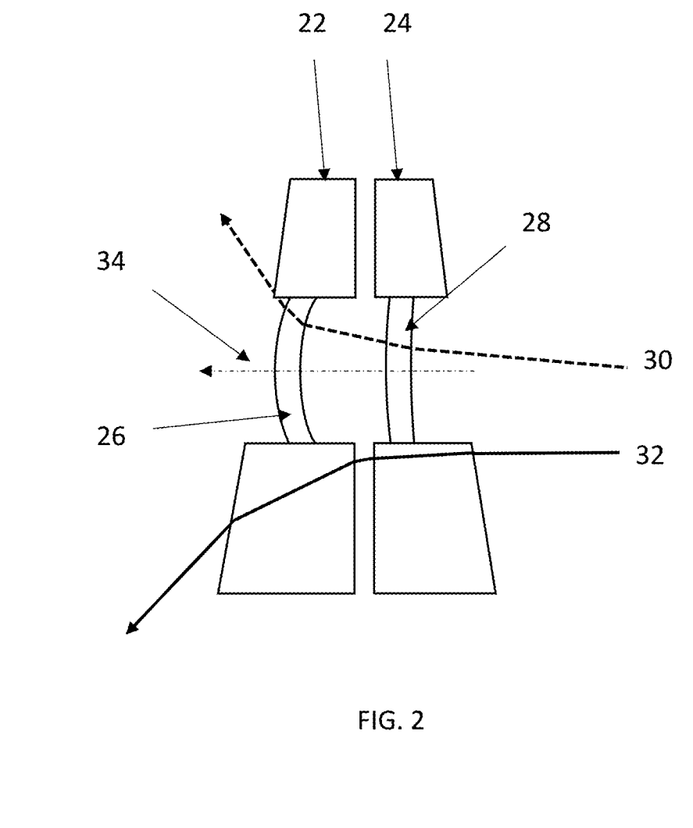
FIG. 2 shows a diagram of one embodiment of dissimilar optical systems co-located in a single aperture having monolithic lenses according to the principles of the present disclosure.

Referring to FIG. 2, a diagram of one embodiment of dissimilar optical systems co-located in a single aperture having monolithic lenses according to the principles of the present disclosure is shown. More specifically, a first half of a Risley prism assembly 22 and a second half Risley prism assembly 24 represent cross sections through two Risley wedges. The Risley elements rotate independently in a plane perpendicular to the black dashed line (the rotational axis 34). Central cores of each element have been replaced with a multi-element lens assembly (26, 28). In some cases, the individual lenses 26, 28 are monolithically fabricated from the same substrate as the respective Risley elements 22, 24.

The lens elements 26, 28 are rotationally symmetric and, as such, when properly fabricated, do not steer based on Risley prism orientation. The lower ray 32 represents a notional primary beam path of a narrow field of view (NFOV) through the Risley prisms, which may be steered by rotating the Risley elements 22, 24. The upper ray 30 represents a notional secondary path of a wide field of view (WFOV) optic (e.g., lenses). Because the central core is rotationally symmetric, the ray 30 traveling through the lenses 28, 26 is un-steered, meaning that despite any rotation of the Risley prisms 22, 24, the ray 30 travels in the same direction.

Figure 3:
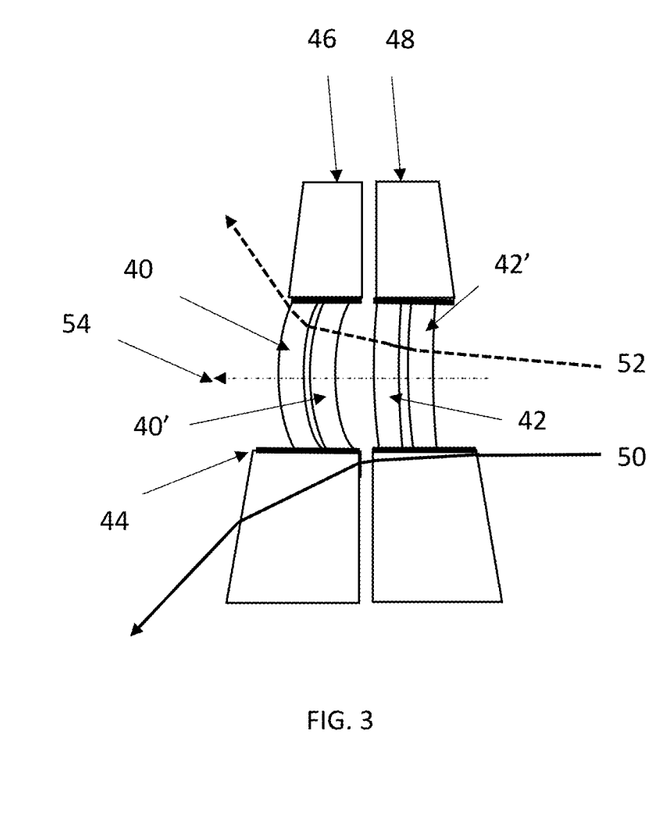
FIG. 3 shows a diagram of one embodiment of dissimilar optical systems co-located in a single aperture having bonded lenses according to the principles of the present disclosure.

Referring to FIG. 3, a diagram of one embodiment of dissimilar optical systems co-located in a single aperture having bonded lenses according to the principles of the present disclosure is shown. More specifically, a first half of a Risley prism assembly 46 and a second half Risley prism assembly 48 represent cross sections through two Risley wedges. The elements rotate independently in the plane perpendicular to the black dashed line (rotation axis 54). The central cores of each wedge element 46, 48 has a multi-element lens assembly 40, 40', 42, and 42'. The thicker black lines 44 represent glue lines for embodiments when then lenses are coupled to the Risley prisms to have integrated lenses with the Risley prisms. In certain embodiments standard adhesives and/or RTVs are used to bond the lens assembly to the Risley assembly. RTV stands for room temperature vulcanizing. RTV silicone begins to cure immediately upon being exposed to air, as opposed to the curing agents in water-based sealants. It lends itself well to working as a sealer because it is water-repellent, adhesive and holds its shape. In certain embodiments, the individual lenses (40, 40', 42, and 42') are bonded into a previously hollowed core or mating receptacle (not shown) of the Risley elements. The lenses may be bonded directly to the wedge elements 46, 48 or bonded into a lens tube, or the like, and then the lens tube may be bonded to the wedge.

In certain embodiments, the lens elements (40, 40', 42, and 42') are rotationally symmetric and do not steer based on Risley prism orientation. This approach allows for more flexibility in choice of materials (e.g., glass) or the ability to utilize multiple focusing elements per wedge. The lower ray 50 represents a notional primary beam path through the Risley prism region (NFOV), which may be steered by rotating the Risley elements 46, 48. The upper ray 52 represents a notional secondary path of a wide field of view (WFOV) optic (e.g., lenses) and, since the central cores 42, 42', 40, 40' are rotationally symmetric, this ray is un-steered as the Risley prisms rotate; there is generally no benefit to rotating the WFOV system. Focusing during operation may be done, but it is likely more advantageous to adjust the lenses installed in the wedges using a fine-resolution motor than moving the entire wedge/lens assembly. The focus motor (not shown) can be placed behind the lenses to move the required lens(es). In certain embodiments, the Risley wedges only have one axis of symmetry. If the WFOV system is asymmetric, it would have different iFOVs on different parts of a scene. This could be advantageous for a security system in the corner of a room, so that not as many pixels are devoted to a given area.

Figure 4:
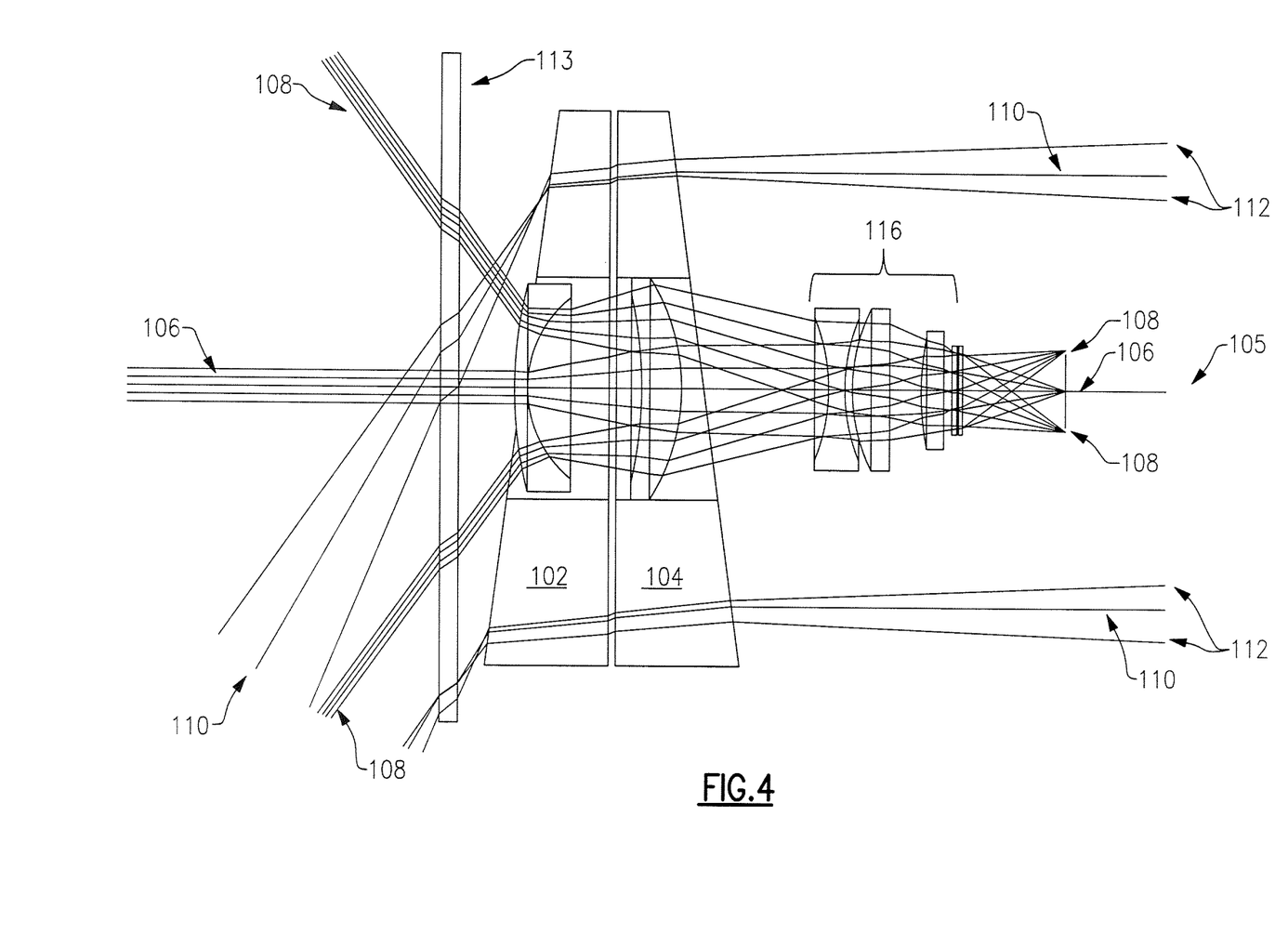
FIG. 4 shows a close up view of a front portion of one embodiment of dissimilar optical systems co-located in a single aperture having a separate lens assembly according to the principles of the present disclosure.
Figure 5:
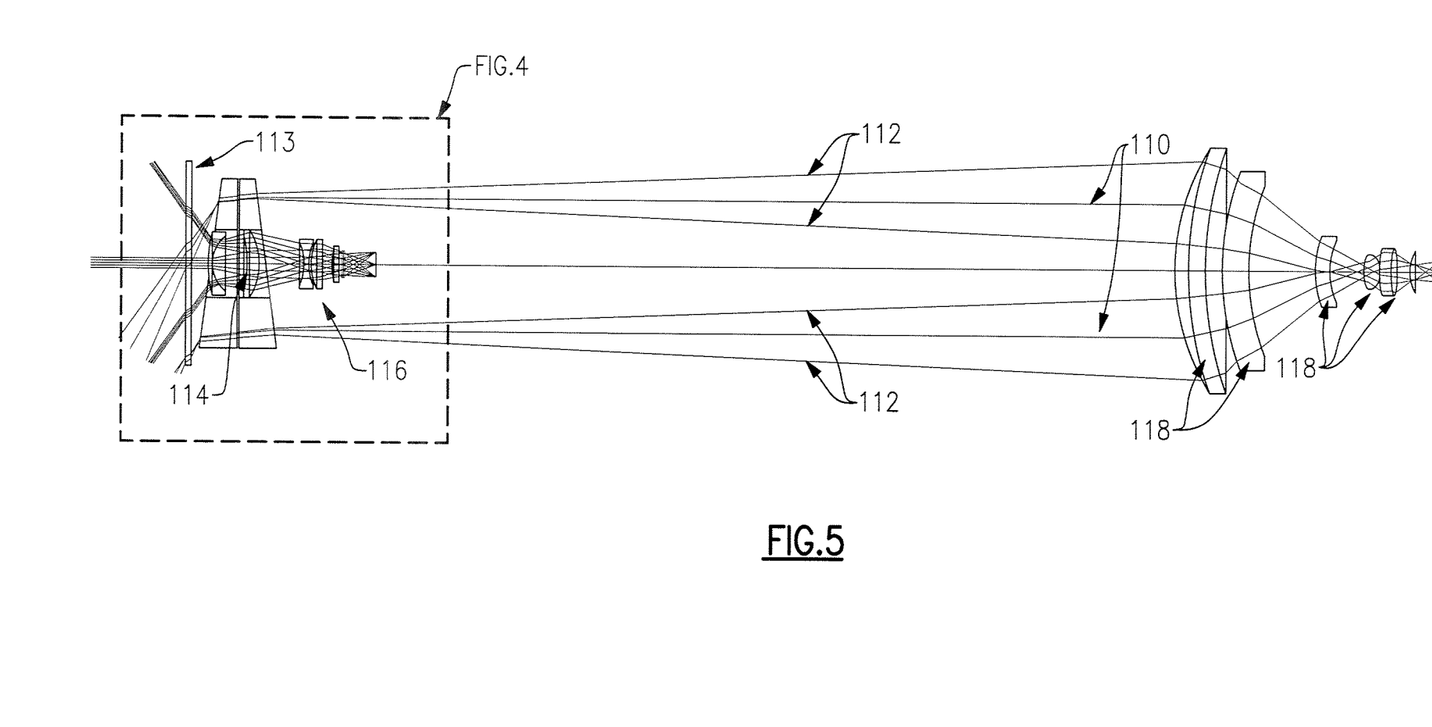
FIG. 5 shows a broader view of both subsystems of one embodiment of dissimilar optical systems co-located in a single aperture having a separate lens assembly according to the principles of the present disclosure.

Referring to FIG. 4 and FIG. 5 diagrams of one embodiment of dissimilar optical systems co-located in a single aperture having a separate lens assembly according to the principles of the present disclosure are shown. More specifically, FIG. 4 shows a close up view of one portion of the combined system and FIG. 5 shows a broader view of the combined system. The wedge elements 102, 104 rotate about an optical axis 105 to steer the NFOV system, which collects photons from the outer ring. The central WFOV lens assembly within the wedge elements 102, 104 is fixed (i.e. does not rotate with the wedge elements) and collects photons from the inner ring region. The WFOV system provides continuous monitoring of an area of interest while the steered NFOV system provides better resolution of a subset of the area of interest. In an infrared system used for security, for example, the WFOV system would detect an object like a human or a drone that approaches the area of interest, after which the steered NFOV line of sight is pointed towards the object of interest to provide identification.

Still referring to FIG. 4, a close up view of a front section of one embodiment of a combined WFOV and NFOV system using two refractive lens assemblies is shown. Elements 102 and 104 are Risley prisms and the WFOV lenses 116 are also illustrated. The rays 106 are WFOV on-axis that focus onto the center of the focal plane and rays 108 are WFOV full-field that focus onto the edge of the focal plane. The rays 110 are NFOV on-axis and the rays 112 are NFOV full-field. A single aperture window 113 is used to capture the incoming signals. Regardless of the rotation or position of the Risley prisms 102, 104, the incoming rays 106 and 108 pass through the optics elements in the same manner.

Still referring to FIG. 5, a broader view of both subsystems of one embodiment of a combined WFOV and N FOV system using two refractive lens assemblies is shown. There, the rays 110 are NFOV on-axis and the rays 112 are NFOV full-field. The elements 114 and 116 are the WFOV lenses, some of which are inside the Risley prisms (114) and some which are outside (116). The lenses outside the Risley prisms 116 would be the most feasible to adjust for focus compensation. The elements 118 are the NFOV lens assembly capturing the images from a single aperture that in one example is enabled by a single exterior window 113.

Figure 6:
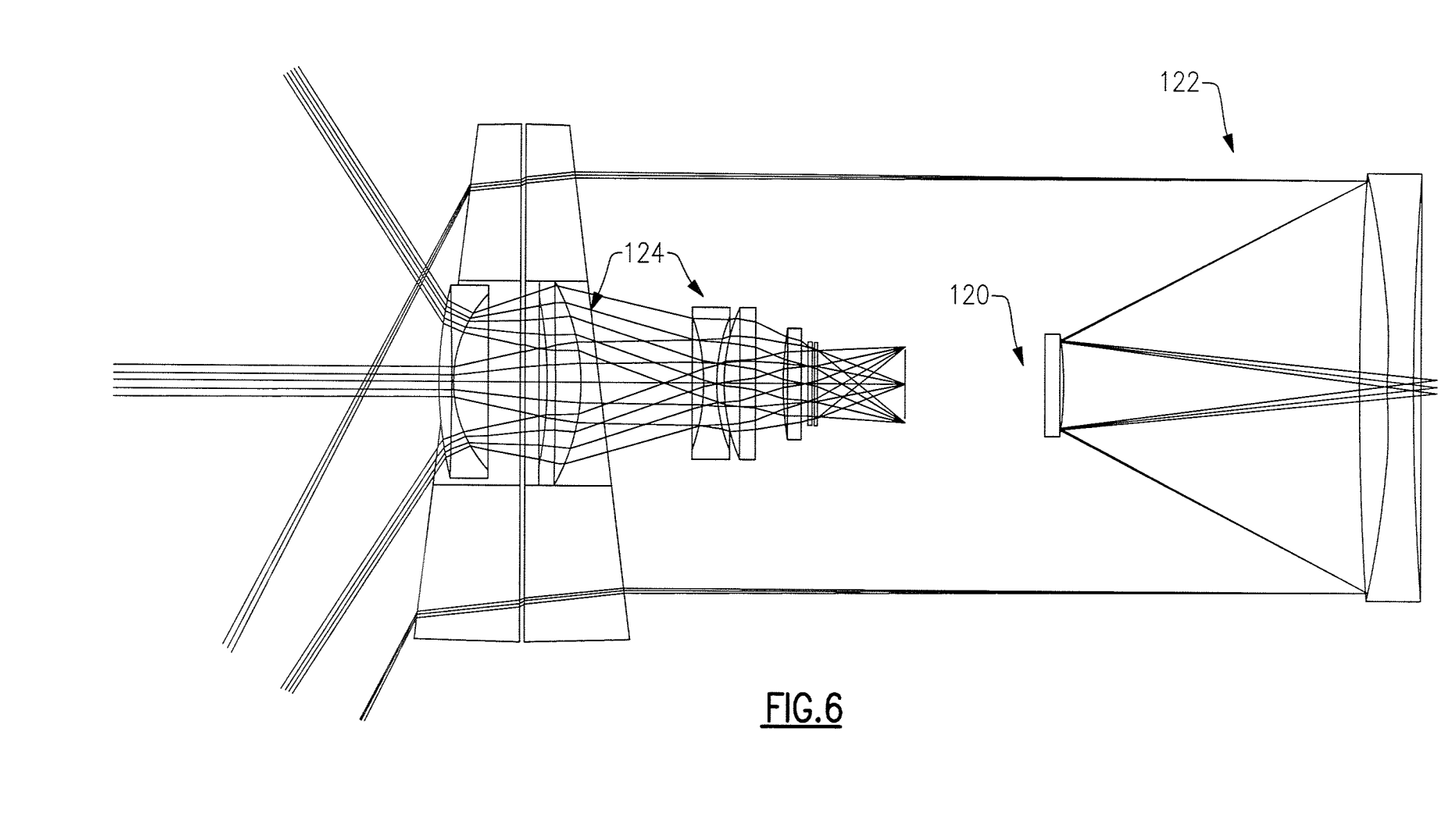
FIG. 6 shows a diagram of another embodiment of the present disclosure where the narrow field of view (NFOV) subsystem is a reflective Cassegrain-type optical system instead of a refractive lens assembly.

Referring to FIG. 6, a diagram of another embodiment of the present disclosure where the NFOV subsystem is a reflective Cassegrain-type optical system instead of a refractive lens assembly is shown for the incoming NFOV signals 122. This combination of systems employs a smaller secondary mirror 120 in the Cassegrain design 122 that obscures the central photons. Placing the WFOV lens assembly 124 in the region already obscured adds functionality without reducing performance of the NFOV system. In this case, the WFOV line of sight is fixed while the NFOV line of sight is steered by the Risley assembly. The WFOV in this embodiment receives photons that are reflected off objects for shorter wavelengths or emitted by objects for longer infrared wavelengths Note that, although the FOV of the reflective Cassegrain telescope is much less than the FOV of the refractive design shown in FIG. 5, both are considered NFOV systems compared to the WFOV refractive design.

Figure 7:
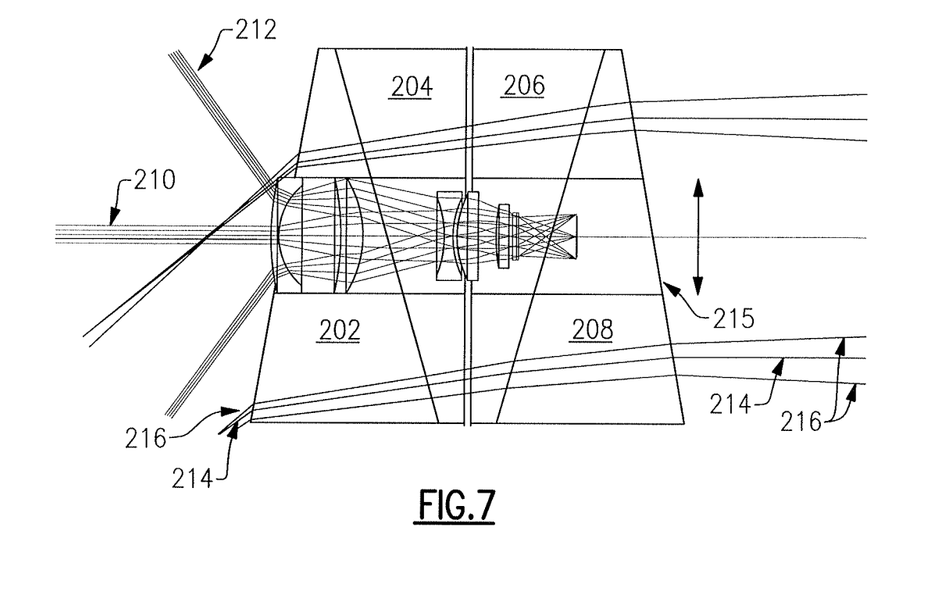
FIG. 7 shows a close up view of a front portion of one embodiment of dissimilar optical systems co-located in a single aperture having a separate lens assembly according to the principles of the present disclosure.
Figure 8:
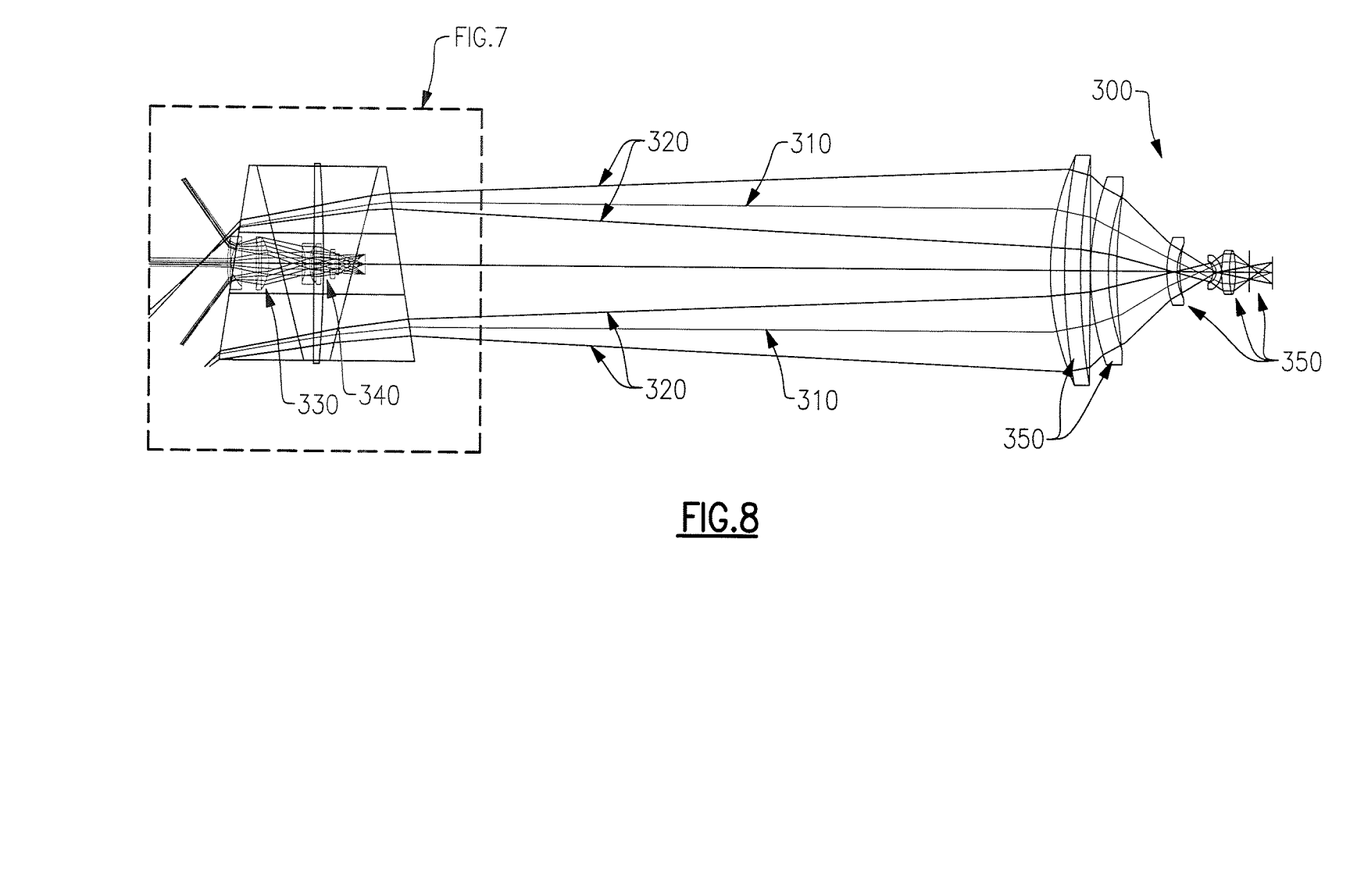
FIG. 8 shows a broader view of both subsystems of one embodiment of dissimilar optical systems co-located in a single aperture having a separate lens assembly according to the principles of the present disclosure.

Referring to FIG. 7 and FIG. 8, diagrams of one embodiment of dissimilar optical systems co-located in a single aperture having a separate lens assembly according to the principles of the present disclosure are shown. More specifically, FIG. 7 shows a close up view of one portion of the combined system and FIG. 8 shows a broader view of the combined system. The wedge elements 202, 204, 206, 208 rotate about an optical axis to steer the NFOV system, which collects photons from the outer ring. The central WFOV lens assembly 215 is fixed in position (i.e. does not rotate with the wedge elements) and collects photons from the inner ring region. In certain cases, the baseline approach is for the WFOV optics to be detached from the Risley wedges. These figures do not show the required opto-mechanics like lens cells, spiders, or the like. The WFOV system 215 provides continuous monitoring of an area of interest while the steered NFOV system provides better resolution of a subset of the area of interest. In an infrared system used for security, for example, the W FOV system would detect an object like a human or a drone that approaches the area of interest, after which the steered NFOV line of sight is pointed towards the object of interest to provide identification.

Still referring to FIG. 7, a diagram of a close up view of a front portion of one embodiment of dissimilar optical systems co-located in a single aperture having a separate lens assembly according to the principles of the present disclosure is shown. More specifically, a different Risley design with four elements instead of two is shown, still containing the WFOV system inside. This Risley design embodiment can better compensate for chromatic error that is present with two elements. There, elements 202, 204 and 206, 208 are Risley prisms pairs. The rays 210 are WFOV on-axis and rays 212 are WFOV full-field. The rays 214 are NFOV on-axis and the rays 216 are NFOV full-field.

Still referring to FIG. 8 a broader view of both subsystems of one embodiment of dissimilar optical systems co-located in a single aperture having a separate lens assembly according to the principles of the present disclosure is shown. More specifically, this embodiment is the same as shown in FIG. 7, showing a refractive lens assembly 300 behind the Risley and WFOV front elements. The broader view of both subsystems of one embodiment of a combined WFOV and NFOV system using two refractive lens assemblies is shown. The rays 310 are NFOV on-axis and the rays 320 are NFOV full-field. The elements 330 and 340 are the WFOV lenses, some of which are within the inner most Risley prisms (340) and some which are within the outer most Risley prisms (330). The elements 350 are the NFOV lenses.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. An optical system, comprising:
    an optical system in the center section; and
    an optical system in the outer region;
    wherein the optical system in the outer region lens assembly is a narrow field of view (NFOV) subsystem and the optical system in the center section is a wide field of view (WFOV) subsystem, said NFOV and WFOV having effective focal lengths which differ by at least 2×; and
    wherein the optical system in the center section has a first field of view with spectral coverage of one waveband and the optical system in the outer region has a second field of view with spectral coverage of another waveband within a single aperture; the photons from the outer region do not reach the optics in the center region and vice versa.

2. The optical system according to claim 1, wherein the optical system in the outer region is a Risley prism assembly, constructed of two or more prism elements such that the outer region is transmissive for the outer region waveband(s) and the optical system in the center section is a lens assembly that is transmissive for the inner region waveband(s).

3. The optical system according to claim 1, wherein the optical system is part of a telescope and wherein the angular object space coverage for the NFOV is less than 5° and the angular object space coverage for the WFOV is 5° or more.

4. The optical system according to claim 2, wherein the optical system in the outer region may be steered by rotating the Risley prism assembly, and the optical system in the center region remains unsteered during rotation of the Risley prism assembly.

5. The optical system according to claim 2, wherein the center region lens assembly is integral with the Risley prism assembly.

6. The optical system according to claim 2, wherein one or more lenses of the center region lens assembly is glued to at least one prism in the Risley prism assembly.

7. The optical system according to claim 2, wherein subsystems of the outer region and the center section contain optical elements and detectors that cover different spectral wavebands.

8. The optical system according to claim 1, wherein the wavebands comprise one or more of the following: ultraviolet (UV) region between 250 nm and 400 nm, visible (VIS) region between 400 nm and 700 nm, near-infrared (NIR) region between 700 nm and 1200 nm, shortwave infrared (SWIR) region between 1200 nm and 2500 nm, midwave infrared (MWIR) region between 2500 nm and 5500 nm, and longwave infrared (LWIR) region between 5500 nm and 14000 nm.

9. The optical system according to claim 1, wherein the center section lens assembly comprises glass, semiconductor material, or other substrate that is transmissive at the relevant waveband.

10. The optical system according to claim 1, wherein the optical system in the outer region comprises glass, semiconductor material, or other substrate that is transmissive at the relevant waveband.

11. An optical system, comprising:
an optical system in a center section; and
an optical system in an outer region;
wherein the optical system in the outer region is a narrow field of view (NFOV) subsystem and the optical system in the center section lens assembly is a wide field of view (WFOV) subsystem, said NFOV and WFOV having effective focal lengths which differ by at least 2×; and
wherein the optical system in the center section has a first field of view with spectral coverage of one waveband and the optical system in the outer region has a second field of view with spectral coverage of another waveband within a single aperture and the outer region is a Risley prism assembly, constructed of two or more prism elements such that the outer region is transmissive for the outer region waveband(s) and the center section is a lens assembly that is transmissive for the center section waveband(s).

12. The optical system according to claim 11, wherein the optical system is part of a telescope and wherein the angular object space coverage for the NFOV is less than 5° and the angular object space coverage for the WFOV is 5° or more.

13. The optical system according to claim 11, wherein the optical system in the outer region may be steered by rotating the Risley prism assembly, and the optical system in the center section remains unsteered during rotation of the Risley prism assembly.

14. An optical system, comprising:
an optical system in a center section; and
an optical system in an outer region;
wherein the optical system in the center section has a first field of view with spectral coverage of one waveband and the optical system in the outer region has a second field of view with spectral coverage of another waveband within a single aperture and wherein the first field of view and the second field of view have effective focal lengths which differ by at least 2×;
the wavebands comprise one or more of the following: ultraviolet (UV) region between 250 nm and 400 nm, visible (VIS) region between 400 nm and 700 nm, near-infrared (NIR) region between 700 nm and 1200 nm, shortwave infrared (SWIR) region between 1200 nm and 2500 nm, midwave infrared (MWIR) region between 2500 nm and 5500 nm, and longwave infrared (LWIR) region between 5500 nm and 14000 nm; and
the outer region is a Risley prism assembly, constructed of two or more prism elements such that the outer region is transmissive for outer region waveband(s) and the center section is a lens assembly that is transmissive for inner region waveband(s).

15. The optical system according to claim 14, wherein the center section lens assembly is integral with the Risley prism assembly.

16. The optical system according to claim 14, wherein one or more lenses of the center section lens assembly is glued to at least one prism in the Risley prism assembly.

* * * * *